United States Patent
Crouch et al.

(10) Patent No.: US 6,259,781 B1
(45) Date of Patent: *Jul. 10, 2001

(54) GENERIC DISTRIBUTED PROTOCOL CONVERTER

(75) Inventors: Richard W. Crouch, Gustine; Godfrey D. Watson, Montara, both of CA (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,225

(22) Filed: Aug. 6, 1997

(51) Int. Cl.[7] .................................................. H04M 3/42
(52) U.S. Cl. ............................................. 379/207; 717/5
(58) Field of Search .................................. 379/201, 232, 379/242, 243, 244, 245, 246, 229, 268, 269; 717/1, 2, 3, 4, 5

(56) References Cited

U.S. PATENT DOCUMENTS

| 5,140,590 | * | 8/1992 | Gertsman et al. | 379/232 |
| 5,329,579 | * | 7/1994 | Brunson | 379/201 |
| 5,426,694 | * | 6/1995 | Hebert | 379/242 |
| 5,519,772 | * | 5/1996 | Akman et al. | 379/265 |
| 5,546,453 | * | 8/1996 | Hebert | 379/242 |
| 5,548,640 | | 8/1996 | Blondel et al. | 379/242 |
| 5,564,061 | * | 10/1996 | Davies et al. | 395/884 |
| 5,664,102 | * | 9/1997 | Faynberg | 379/207 |
| 5,917,807 | * | 6/1999 | Lee et al. | 379/243 |

FOREIGN PATENT DOCUMENTS

| EP 0 617 369 | 9/1994 | (EP) | G06F/13/38 |
| 0 810 799 A2 | 12/1997 | (EP) . | |
| 2 299 483 | 10/1996 | (GB) . | |

OTHER PUBLICATIONS

Copy of Office Action for German Appln. No. 198 33 886.4–31; date office action issued: Jul. 10, 2000.

* cited by examiner

Primary Examiner—Ahmad F. Matar
Assistant Examiner—Benny Q. Tieu

(57) ABSTRACT

A system for isolating portions of a computer program in a telecommunication system that receives messages from a variety of hardware or software platforms. A generic protocol converter (50) receives the message and selects a set of tables (52, 54, 56, 58) based upon the platform of the source or destination of the message. A table within the table set is selected based on the direction of the message. Within each table is a listing of subroutines that are associated with a particular message. The protocol converter calls the appropriate subroutine within a main application program (70) to handle the message. Because the tables are grouped by protocol types, a change to the application program involving one protocol type does not require recompiling or retesting of application programs or subroutines associated with other protocols.

6 Claims, 3 Drawing Sheets

GENERIC DISTRIBUTED PROTOCOL CONVERTER

FIELD OF THE INVENTION

The present invention relates to computer systems in general, and in particular to methods of isolating code segments of computer programs that operate in multiple platform environments.

BACKGROUND OF THE INVENTION

As computer systems become increasingly powerful, tasks that once were accomplished by dedicated hardware systems are now being performed by generic hardware that operates specialized computer software. As a result, computer software is becoming increasingly complex and requires a significant effort to design as well as the application of strict quality control techniques to insure that the software operates properly under all conditions.

One environment in which computer software is increasingly used is in telecommunication equipment. In the past, telephone switches, like private branch exchanges or central office switches, have had hardware-specific equipment that connects to or controls specific types of telephone equipment such as rotary phones, digital phones, message phones, etc. The software used to control this equipment has resided in a large in-line code file that is executed by a central processing unit or by one of a number of individual processors.

While a single in-line code file works well for software that is fully operational, this architecture presents problems if modifications need to be made. For example, if a new feature, such as a distinctive ringing signal needs to be added to a specific type of telephone equipment, then it was previously necessary to edit the large in-line code file. The software code required to provide the new function would have to be added to the in-line code file, and all references within the code file that refer to the feature would need to be modified to reflect the new functions provided. However, by editing the in-line code file, the programmer could never be certain that a change had not been inadvertently made to a portion of the code that was not intended to be modified. For example, if a feature that provides a new ringing signal to a rotary phone is added, a programmer could not be certain that an inadvertent change was not made that would affect the operation of the digital phones, etc. Therefore, upon each modification of the in-line code, extensive testing techniques were required to make sure that all functions provided by the software were still operational. This method of editing an in-line code file was both time intensive and costly, even when only simple modifications were made to the controlling software. Furthermore, by grouping all the software code in a single code file, only one programmer could access the code at any given time, thereby decreasing programmer efficiency.

In light of the problems associated with modifying large in-line code files, it was recognized that methods were needed to allow computer programs that operate in multi-platform environments to be easily modified without the need to retest those portions of the code that were unaffected.

SUMMARY OF THE INVENTION

To solve the problems associated with large in-line code files, the present invention is a system for isolating portions of a computer program that operates in a computer system that receives messages from a variety of hardware and software platforms. A generic protocol converter receives the messages and selects a set of tables based upon the platform type of the source or the destination of the message. Tables within a table set are then selected based on the direction of the message. For messages directed in a particular direction, the table specifies a subroutine that is called within a common application program.

If modifications need to be made to the common application program, the subroutines specified by table sets associated with different platforms do not need to be recompiled or retested. In addition, because the tables call subroutines that are hardware specific, the common application program can be written to handle messages originating from numerous types of platforms by using subroutines to convert different message formats into a common protocol.

In one actual embodiment of the invention, the generic protocol converter is used in a telecommunication system such as a private branch exchange (PBX). Each of the table sets is associated with a particular type of telephone hardware such as rotary phones, digital phones, European format phones, or message phones, etc.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As indicated above, the present invention is a system for isolating segments of a computer program in a message processing system that operates with a variety of different hardware and software platforms. The system includes a protocol converter that separates functions associated with different platforms so that modifications made to the computer program can be isolated without the need to recompile or retest the entire program. Although the currently preferred use of the invention is in a telecommunication system, those skilled in the art of computer programming will recognize that the invention can be used in other environments as well.

Figure 1:
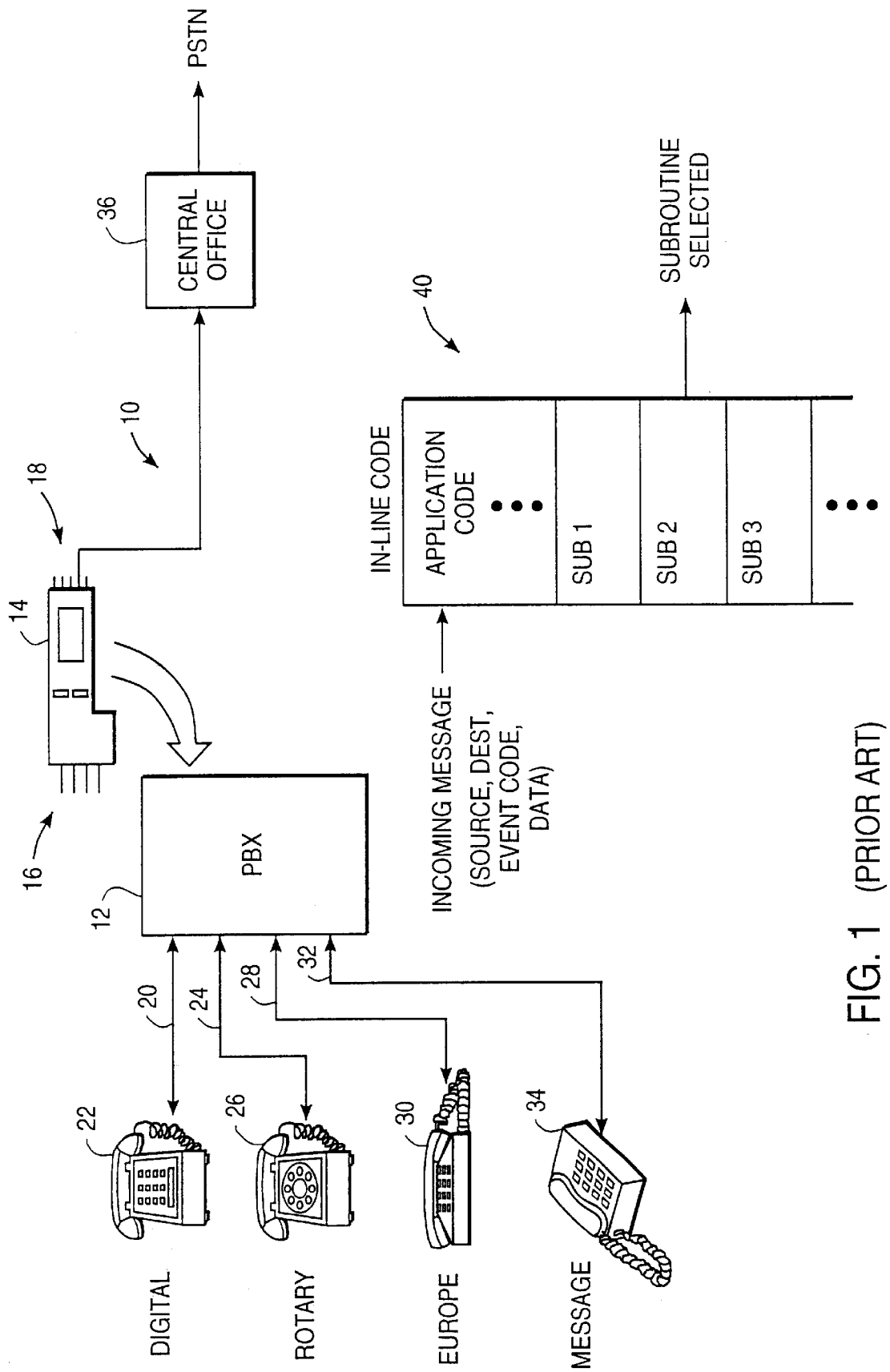
FIG. 1 illustrates a prior art communication system that is controlled by an in-line code computer program.

FIG. 1 illustrates a prior art telecommunication system that is controlled by a single in-line computer program. The communication system 10 includes a private branch exchange (PBX) or other switch 12 that connects a plurality of telephones to a remote central office 36. Inside the PBX 12 are a plurality of network cards 14 that have a number of input telephone lines 16 that connect the cards to a number of telephones or telephone equipment, such as voice mail systems, facsimile machines, etc. In addition, the network cards include a plurality of output telephone lines 18 that connect the card to the central office 36.

In general, the network cards 14 are configured for a particular type of telephone hardware. For example, the PBX contains network cards 14 that are specially designed for digital phones 22, rotary phones 26, European format phones 30, or digital messaging phones 34. Each of these different types of telephone equipment are connected to the PBX by a particular type of telephone line 20, 24, 28, and 32, respectively.

As indicated above, the computer program that controls the PBX 12 and the network cards 14 was previously written as an in-line code computer program 40. The computer program 40 generally contained a sequence of intermingled instructions and subroutines that cause the PBX to interface with each of the various types of telephones or telephone equipment. The computer program 40 operates in response to messages that are generated by the telephone equipment or by the central office 36. Each message typically includes a source code that identifies the source of the message, a destination code that identifies the destination of the message, an event code that specifies what type of message is being sent and a data field that contains the content of the message. One example of such a message is an "off hook" message that is sent from the telephones to the PBX when a user picks up a handset of the telephones 22, 26, 30, or 34. It will be appreciated that the particular format in which the off hook message is sent may vary depending upon the type of telephone from which the message originated. In addition, messages can be sent to the PBX 12 from the central office 36. One example of such a message is a ringing message that indicates a call has been received for a particular telephone line.

The in-line computer program 40 processes the messages by executing a series of instructions or subroutines that are written for the particular type of telephone equipment or telephone line at the source or the destination of the message, as well as the particular type of event code received in the message. For example, the computer program may take different actions to send a ringing signal to the rotary phone 26 than it does to send a ringing signal to the digital message phone 34.

In the past, if the computer program 40 needed to be modified, either to fix an error or to add a new feature, the new computer code would have to be added to the file and the entire computer program 40 would be recompiled. In addition, it was necessary to exhaustively retest the entire computer program to insure that no unintended errors or bugs were introduced into the code. For example, if a distinctive ringing signal is added for the rotary phone 26, then the computer program 40 must be modified to include the series of instructions that cause the network card in the PBX that controls rotary phones to send a distinctive ringing signal to a rotary phone. In addition, any portions of the code that reference a ringing signal must be modified to reflect the new type of ringing signal available. Finally, because the program segments that are written for the various platforms are intermingled, the entire computer program must be recompiled and tested to insure that no errors were introduced when the technician added the new instructions.

As discussed above, the time and expense required to recompile and exhaustively retest a computer program when any modification is made is not only costly, but also increases the time required to produce a new computer program.

To solve the problems associated with commingling the code that operates various types of telephones or telephone equipment, the present invention comprises a distributed protocol converter that allows computer code that is directed to different hardware or software platforms to be separated. By separating portions of the code according to the various platforms that the program controls, it is possible to modify or update the code without having to recompile and test the software associated with other unaffected hardware platforms.

Figure 2:
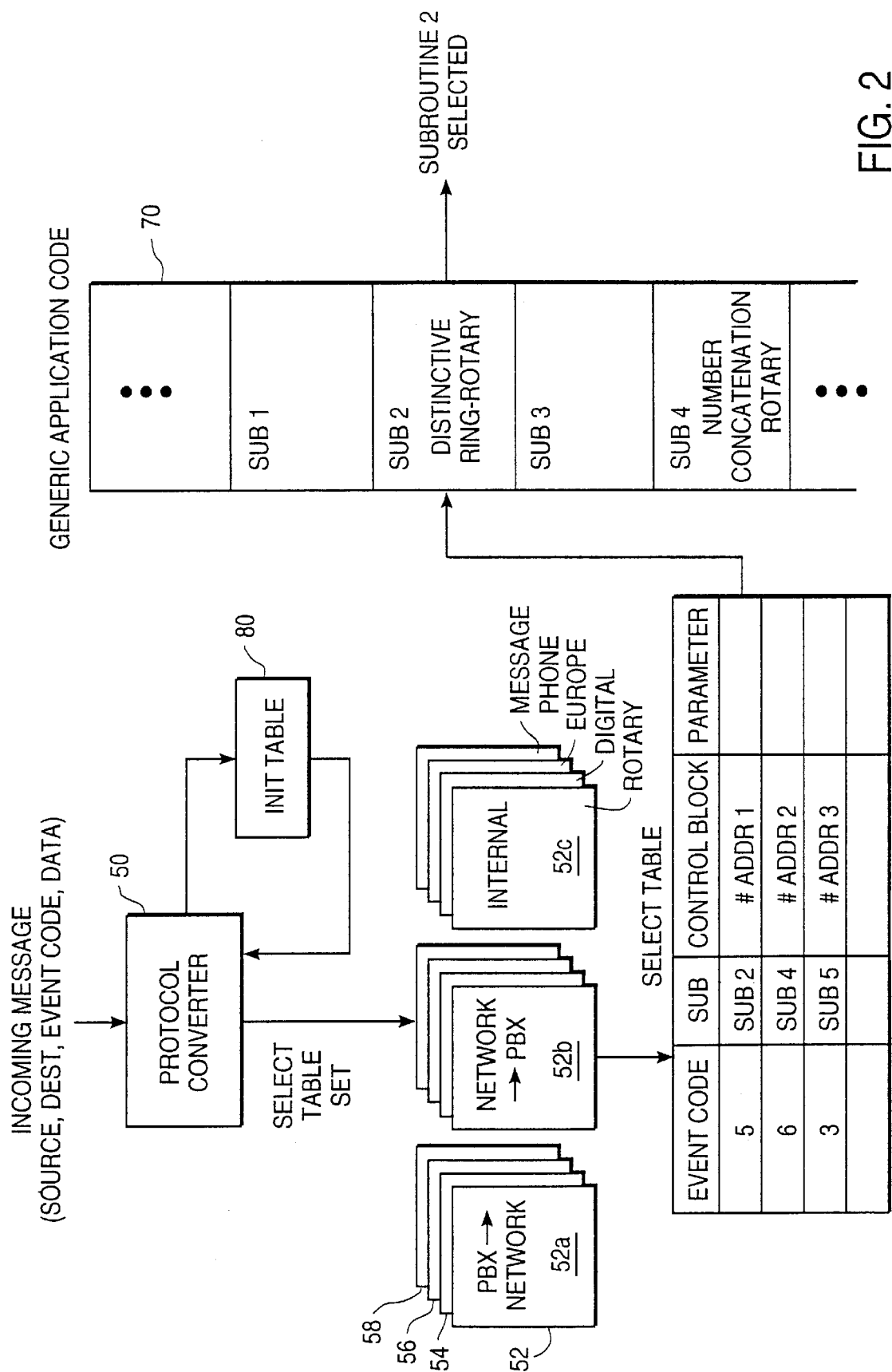
FIG. 2 illustrates a generic distributed protocol converter according to the present invention.

As shown in FIG. 2, the protocol converter 50 is a computer program that receives an incoming message containing a source code, a destination code, an event code, and a data field from a piece of telephone equipment or a central switch. The protocol converter 50 then operates to select a set of tables based upon the particular hardware platform of the source or the destination. In the example shown, the protocol converter includes four sets of tables. A table set 52 is constructed for rotary telephones. A table set 54 is constructed for digital phones. A table set 56 is constructed for phones that operate according to a European protocol, and a table set 58 is constructed for digital message phones. The table sets 52–58 are considered to be merely illustrative. If additional hardware platforms are used in a communication system, then additional table sets would be provided. Alternatively, the tables could be arranged by other factors such as the version number of the software that controls the source or destination of the message.

Within each table set are tables that are arranged according to the direction of the message. For example, a table 52*a* is constructed for messages that are directed from the PBX to the telephone network. A table 52*b* is constructed for messages coming from the network to the PBX, and a table 52*c* is constructed for messages that are internal to the PBX.

Upon selecting the correct table set using the source code or the destination code described above, the protocol converter 50 selects the appropriate table within the selected table set and calls a subroutine associated with the event code that is contained in the received message. Each table within the table sets includes a column containing event codes, as well as a column that matches a subroutine of a generic application program 70 to the particular event code. In addition, the tables include a control block that contains the address of a scratch pad memory that may be used by the subroutine, and a parameter column that may contain a hard coded value or memory address, if desired.

Upon selecting a subroutine for a particular event code, the corresponding subroutine is called from a generic application program 70. The application program 70 may be stored as a plurality of code segments in a plurality of files. Each code segment and its corresponding table set are associated with a particular hardware or software platform. For example, one code segment may contain code that operates rotary telephones, and another code segment may contain code that operates digital telephones, etc. Alternatively, the computer program 70 may include a code segment that is written in a generic form to handle messages intended for all platform types.

The protocol converter 50 allows the application program 70 to be modified without requiring that all the code segments be recompiled and tested after each modification. For example, if the application program 70 is modified to cause a network card to create a distinctive ring in a rotary-type telephone, then a new subroutine containing a sequence of instructions required to cause the distinctive ringing is added to the code segment that operates the rotary telephones. A new entry in the table 52*b* can be added that relates the new subroutine to a message received from the network indicating that a distinctive ringing signal is to be applied to a rotary telephone. For example, assume that a distinctive ring message is represented by an event code that is identified by the number 5, then the generic protocol converter opens the table 52*b* and sees that the subroutine 2 should be called. The application program 70 then executes the subroutine 2. The subroutine 2 looks to the table 52b and reads an address of a scratch memory that is contained in the control block column of the table to be used by the subroutine if needed.

When modifying the application program 70, it is always possible that adding a new feature to the code will affect the other message handling routines written for that particular platform. Therefore, it is generally necessary to test each subroutine listed in the tables associated with that particular platform. However, if no changes have been made to the other platforms, then the files of the application program associated with the other platforms do not need to be recompiled or tested. Thus, the present invention has the effect of isolating changes made to the application program 70 to the subroutines listed in a particular table.

The generic distributed protocol converter 70 also allows the application program 70 to be written generically, i.e., for use with multiple platforms. For example, in many instances, the format in which a message is received may vary from platform to platform. The generic protocol converter can call subroutines that convert the messages to a common format or protocol that can be handled by a single routine within the application program 70. For example, a message that defines a telephone number dialed at a particular telephone may be received in one of several formats depending on the type of telephone used to dial the number. A rotary phone may transmit such a message as a sequence of off/on pulses on a telephone line. In contrast, a digital telephone may transmit such a message as a single digital packet.

To allow the application program 70 to have a single subroutine that processes all incoming number dialed messages, the table 52a that is associated with messages from a rotary telephone to the network contains an entry for a number dialed event. The table 52b maps this event to a subroutine, such a subroutine 4, that converts the pulses into a digital packet that can be forwarded to a common subroutine that processes the incoming telephone number messages from all types of telephones.

Figure 3:
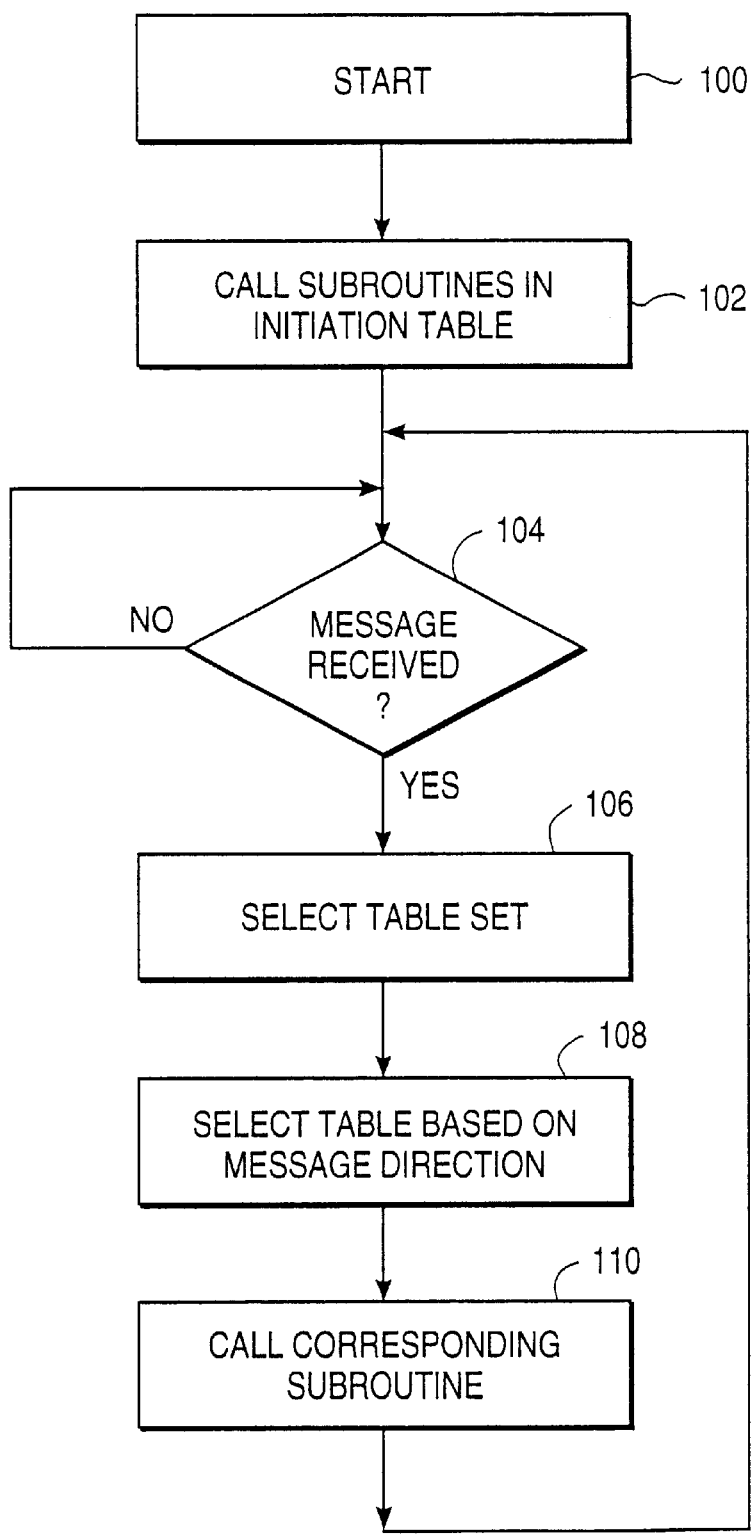
FIG. 3 is a flow chart of the steps performed by the generic distributed protocol converter to select one or more subroutines in a common application program.

FIG. 3 illustrates a flowchart of the steps performed by the generic protocol converter to process an incoming message. Beginning at a step 100, the protocol converter is started when the application program for the PBX is started. At a step 102, the protocol converter is initialized by calling a plurality of routines set forth in an initialization table 80 (FIG. 2). If a particular portion of the PBX or network card needs to be initialized with a subroutine upon start up of the PBX, the software designer places a listing of the subroutine in the initialization table that will be called when the protocol converter is started.

Following initialization, the protocol converter begins a continuous loop that processes incoming messages. At the step 104, the protocol converter determines whether a message has been received, and, if not, processing returns to step 104 until a message has been received. Once a message has been received, the protocol converter selects the appropriate table set at a step 106, based on the particular platform used to either send or receive the message. At a step 108, the protocol converter selects a table within the selected table set based on the direction of the message. As indicated above, the table set currently contains separate tables for messages that are routed from the PBX to the network, from the network to the PBX, and for messages that are internal to the PBX. Once the appropriate table has been selected, the protocol converter calls the subroutine that is associated with the event code contained in the message received at a step 110. After the appropriate subroutine has been called, processing returns to step 104 in order to handle the next message received.

As can be seen from the above description, the present invention allows software routines that are designed for various platforms to be separated such that a change in a single code segment does not require recompiling and exhaustive testing of the code segments that were not affected. In addition, by using the generic protocol converter, applications and message handling subroutines can be designed to work with messages from more than one platform, thereby increasing the efficiency of such computer programs.

As discussed above, the present invention is not limited for use with communication systems, but can be employed in any computer system where it is desirable to isolate various portions of a computer program from inadvertent tampering or modification. For example, the present invention can be used in a computer system that simultaneously operates several computer programs having different protocols. A computer may receive data to be printed in one or more formats such as postscript or HTML, but be configured to use a single driver for a printer. In that case, a protocol converter can be constructed with tables directed to each format, wherein the subroutine called in each table converts the data into a common protocol used by the printer driver. If a change is made to the routines that convert the HTML data to the common protocol, it is not necessary to recompile or retest the routines that convert the postscript data to the common protocol.

The embodiments of the invention in which an exclusive property or privilege is claimed are defined as follows:

1. A telecommunication system for isolating code segments of a computer program that transmits and receives messages associated with a telephone call between a source and destination that operate according to one of a plurality of protocols, comprising:

one or more central processing units that are controlled by a computer program that comprises isolated code segments designed for each of the plurality of protocols; and a generic protocol converter receives incoming messages comprising an indication of the source and destination of the telephone call, the generic protocol converter comprising a plurality of table sets, each table set being defined for one of the plurality of protocols, each table set comprising a mapping of a plurality of isolated code segments in the computer program to the message that is received in one of the plurality of protocols, each said isolated code segment implementing a different protocol and being separately changeable from other isolated code segments, wherein the isolated code segments associated with one of the plurality of protocols may be separately changed via compilation or other code change procedures without recompiling the isolated code segments associated with the other plurality of protocols; and the generic protocol converter operating to select a table based on the protocol of the source or destination and to call an isolated code segment that is mapped to the message by the selected table.

2. The system of claim 1, wherein the isolated code segments and table sets associated with a protocol are stored in separate files.

3. The system of claim 1, wherein the telecommunication system comprises a telephone switch.

4. The system of claim 3, wherein the telephone switch interfaces with a variety of telephone equipment that operate according to a plurality of protocols.

5. A telecommunication system that connects a variety of telephone equipment that operate in one of a plurality of protocols to a network, comprising:

a switch having a plurality of network cards each of which has one or more inputs that are connected to a type of telephone equipment and one or more outputs connected to the network; and a processor in the switch that runs an application program to control the plurality of network cards, the application program including a protocol converter that receives messages including an indication of the source or destination associated with a telephone call, wherein the protocol converter selects a table that associates a separately changeable and isolated code segment for the message in the application program with the protocols of the source or destination of the telephone call wherein the isolated code segments associated with one of the plurality of protocols may be separately changed by compilation or other code change procedures without recompiling the isolated code segments associated with the other protocols.

6. The telecommunication system of claim 5, wherein the isolated code segment and table associated with each of the plurality of protocols are stored in separate files.

* * * * *